(12) United States Patent
    Pai

(10) Patent No.: US 11,481,462 B2
(45) Date of Patent: Oct. 25, 2022

(54) SYSTEM AND METHOD FOR GENERATING A CONTENT NETWORK

(71) Applicant: K Narayan Pai, Mapusa (IN)

(72) Inventor: K Narayan Pai, Mapusa (IN)

( * ) Notice: Subject to any disclaimer, the term of this patent is extended or adjusted under 35 U.S.C. 154(b) by 0 days.

(21) Appl. No.: 17/294,407

(22) PCT Filed: Jan. 1, 2019

(86) PCT No.: PCT/IN2019/050001
§ 371 (c)(1),
(2) Date: May 16, 2021

(87) PCT Pub. No.: WO2020/100154
PCT Pub. Date: May 22, 2020

(65) Prior Publication Data
US 2022/0012294 A1    Jan. 13, 2022

(30) Foreign Application Priority Data
Nov. 16, 2018  (IN) .............................. 201821043109

(51) Int. Cl.
*G06F 16/9535* (2019.01)
*H04L 9/40* (2022.01)
*H04L 67/306* (2022.01)

(52) U.S. Cl.
CPC ........ *G06F 16/9535* (2019.01); *H04L 63/102* (2013.01); *H04L 67/306* (2013.01)

(58) Field of Classification Search
None
See application file for complete search history.

(56) References Cited

U.S. PATENT DOCUMENTS 6,820,204 B1 * 11/2004 Desai .................... H04L 63/101
                                                              705/54
8,874,589 B1 * 10/2014 Liu ..................... G06F 16/9535
                                                              707/749

(Continued)

*Primary Examiner* — Kaveh Abrishamkar
(74) *Attorney, Agent, or Firm* — Boris Leschinsky

(57) ABSTRACT

Disclosed is a system for conducting network building assessments to generate a content network. The system comprises of an interface implemented via one or more computer processors that, upon executing computer-executable instructions, causes a user to access the content network and receive content in accordance to one or more features of the content network, wherein the interface includes a user input component to obtain at least two user identifiers from the user. A server that implements the network building assessments for generating the content network, wherein the server is implemented via one or more computer processors that, upon executing computer-executable instructions, causes the server to receive from the user input component the at least two identifiers, wherein the at least two identifiers include a content network identifier and a user identifier. The server assesses the content network identifier to determine whether the content network identifier is one of an existing content network or new content network, wherein the content network identifier is new content network, request a new content network identifier to generate the new content network, accesses the user identifier to determine whether the user is one of a member or a non-member of the content network, wherein when the user is a non-member of the existing content networks, request information from the user, and generate user profile based on the received information from the non-member via the user input component, and generates a content network for display in the interface in accordance to one or more features of the new content network and the generated user profile.

10 Claims, 8 Drawing Sheets

(56) References Cited

U.S. PATENT DOCUMENTS

| | | | | |
|---|---|---|---|---|
| 9,495,686 | B1* | 11/2016 | Stekkelpak | H04L 67/34 |
| 2007/0055666 | A1* | 3/2007 | Newbould | G06Q 30/02 |
| | | | | 707/999.009 |
| 2008/0205655 | A1* | 8/2008 | Wilkins | G06F 16/27 |
| | | | | 707/999.005 |
| 2008/0255944 | A1* | 10/2008 | Shah | H04L 67/22 |
| | | | | 705/14.47 |
| 2008/0288658 | A1* | 11/2008 | Banga | H04L 63/102 |
| | | | | 709/245 |
| 2010/0125505 | A1* | 5/2010 | Puttaswamy | G06Q 30/02 |
| | | | | 705/14.67 |
| 2012/0041939 | A1* | 2/2012 | Amsterdamski | G06F 16/9535 |
| | | | | 707/E17.108 |
| 2015/0094043 | A1* | 4/2015 | Collins | G06Q 50/01 |
| | | | | 455/414.1 |
| 2016/0119763 | A1* | 4/2016 | Bertz | H04L 67/327 |
| | | | | 370/312 |

* cited by examiner

SYSTEM AND METHOD FOR GENERATING A CONTENT NETWORK

TECHNICAL FIELD

The present disclosure relates to system for conducting network building assessments to build content for a plurality of users. Moreover, the present disclosure concerns methods for conducting network building assessments to build content for a plurality of users. Furthermore, the present disclosure also concerns computer program products for conducting network building assessments to build content for a plurality of users, the computer program products comprising non-transitory machine-readable data storage media having stored thereon program instructions that, when accessed by a processing device cause the processing device to implement the aforementioned method.

BACKGROUND

The advent of the internet age opened up a whole new world of possibilities with regard to information sharing, and in particular, sharing of technical information. However, the technical information may contain many forms which distinguish themselves from generic usage of technology for communication. Capturing the technical information and further processing allows efficient distribution of data. In such cases it is dependent on associations of specific and general-purpose systems.

Networking as a field of technology has provided driving impetus in providing secured exchange of data. However, the processing time required for secured exchange of data plays an important role in implementation of the said technology. Moreover, segregation of data in accordance to system requirements plays an important in information sharing. With so much information available, it is difficult to determine what information is sufficiently important in a specific scenario.

US 2008/0201344 This invention relates to methods for controlling and monitoring access to network servers. In particular, the process described in the invention includes client-server sessions over the Internet. In this environment, when the user attempts to access an access-controlled file, the server subjects the request to a secondary server which determines whether the client has an authorization or valid account. Upon Such verification, the user is provided with a session identification which allows the user to access to the requested file as well as any other files within the present protection domain.

US7200863B2 A system and method is provided for using a DNS server operating on a wide area network to enable an authorized reception device to receive (or be provided with) restricted content data associated with a particular wide area network address and redefine the domain name associated with a particular wide area network address. In a preferred embodiment of the present invention, an authorization application is adapted to provide the reception device with user-verification data, receive from the reception device verification data, and provide the filtering application with authorization data. The filtering application, which operates similarly to prior art DNS server systems, is further adapted to receive filtered data (i.e., password-required data and/or pseudo-domain-name data) and authorization data in order to provide an IP address of the content server to the reception device via a wide area network, such as the Internet.

US20060080284A1 A private network system operates over a public network to provide an asymmetric service to members with information from other members and non-members. The system includes central servers and databases connected via the public network to client systems of public network users. The users may be members who communicate with a private protocol or non-members who communicate with the public protocol. A process for the private service includes communication of information between users via the private service servers. The private service server implements the private service, which includes a viral engine for network deployment. Features of the viral engine include genetic algorithms, data mining, personalization, frictionless service setup, user maximization, and member-controlled privacy. A sample setup process and contact update wizard that include several viral engine features are described.

US20090248844A1 In the context of electronic social networking platforms, 'hybrid profile' management allows a user u to create and locally manage 'pseudo-profiles' reflecting the profile information of real-world contacts who are not actual members of the networking platform. The first-degree electronic social network of a given user u thus includes both the profiles of other regular network users who have agreed to be direct contacts to u as well as these pseudo-profiles.

US8761398B2 In a domain comprising a plurality of devices, the devices in the domain sharing a common domain key, a method of enabling a entity that is not a member of the domain to create an object that can be authenticated and/or decrypted using the common domain key, the method comprising providing to the entity that is not a member of the domain a diversified key that is derived using a one-way function from at least the common domain key for creating authentication data related to said object and/or for encrypting said object, the devices in the domain being configured to authenticate and/or decrypt said object using the diversified key.

US20080201344A1 This invention relates to methods for controlling and monitoring access to network servers. In particular, the process described in the invention includes client-server sessions over the Internet. In this environment, when the user attempts to access an access-controlled file, the server subjects the request to a secondary server which determines whether the client has an authorization or valid account. Upon such verification, the user is provided with a session identification which allows the user to access to the requested file as well as any other files within the present protection domain.

Therefore, in the foregoing there is requirement of a system to solve the aforementioned problems.

SUMMARY

The present disclosure seeks to provide a system for conducting network building assessments to a generate a content network. The present disclosure also seeks to provide a method for conducting network building assessments to a generate a content network. In a first aspect, an embodiment of the present disclosure provides a system for conducting network building assessments to a generate a content network, the system comprising:
  an interface implemented via one or more computer processors that, upon executing computer-executable instructions, causes a user to access the content network to and receive content in accordance to one or more features of the content network, wherein the interface includes a user input component to obtain at least two user identifier of the user;

a server that implements the network building assessments for generating the content network, wherein the server is implemented via one or more computer processors that, upon executing computer-executable instructions, causes the server to:

receive from the user input component at least two identifiers, wherein the at least two identifiers include a content network identifier and a user identifier;

assess determine, based on the content network identifier to determine at least a part of the identifier, whether the content network identifier is one of an existing content network or new content network, wherein the content network identifier is new content network, request a new content network identifier to generate the new content network;

assess the user identifier to determine whether the user is one of a member or a non-member of the content network, wherein when the user is a non-member of the content network, request information from the user, and generate user profile based on the received information from the non-member via the user input component; and build content for display in the interface in accordance to one or more features of the new content network and the generated user profile.

In a second aspect, an embodiment of the present disclosure provides a method of conducting network building assessments, the method comprising:

providing an interface to allow a user of the content network to receive content in accordance to one or more features of the content network, obtaining at least one user identifier of the user from a user input component of the interface;

causing a server to implement one or more network building assessments for the content network that, when executed, includes:

receiving from the user input component the at least one identifier for the user of the content network, wherein the user is one of a member or a non-member of the content network;

determining, based at least in part of the identifier, whether the user is one of a member or a non-member of the content network;

requesting information from the user in response to determining that the user is a non-member of the content network;

generating user profile based on the received information from the non-member via the user input component; and building content for display in the interface in accordance to one or more features of the content network and the user profile.

The present disclosure also provides a computer program product comprising a non-transitory computer-readable storage medium having computer-readable instructions stored thereon, the computer-readable instructions being executable by a computerized device comprising processing hardware to execute the above said method.

Embodiments of the present disclosure substantially eliminate or at least partially address the aforementioned problems in the prior art.

Additional aspects, advantages, features and objects of the present disclosure are made apparent from the drawings and the detailed description of the illustrative embodiments construed in conjunction with the appended claims that follow.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
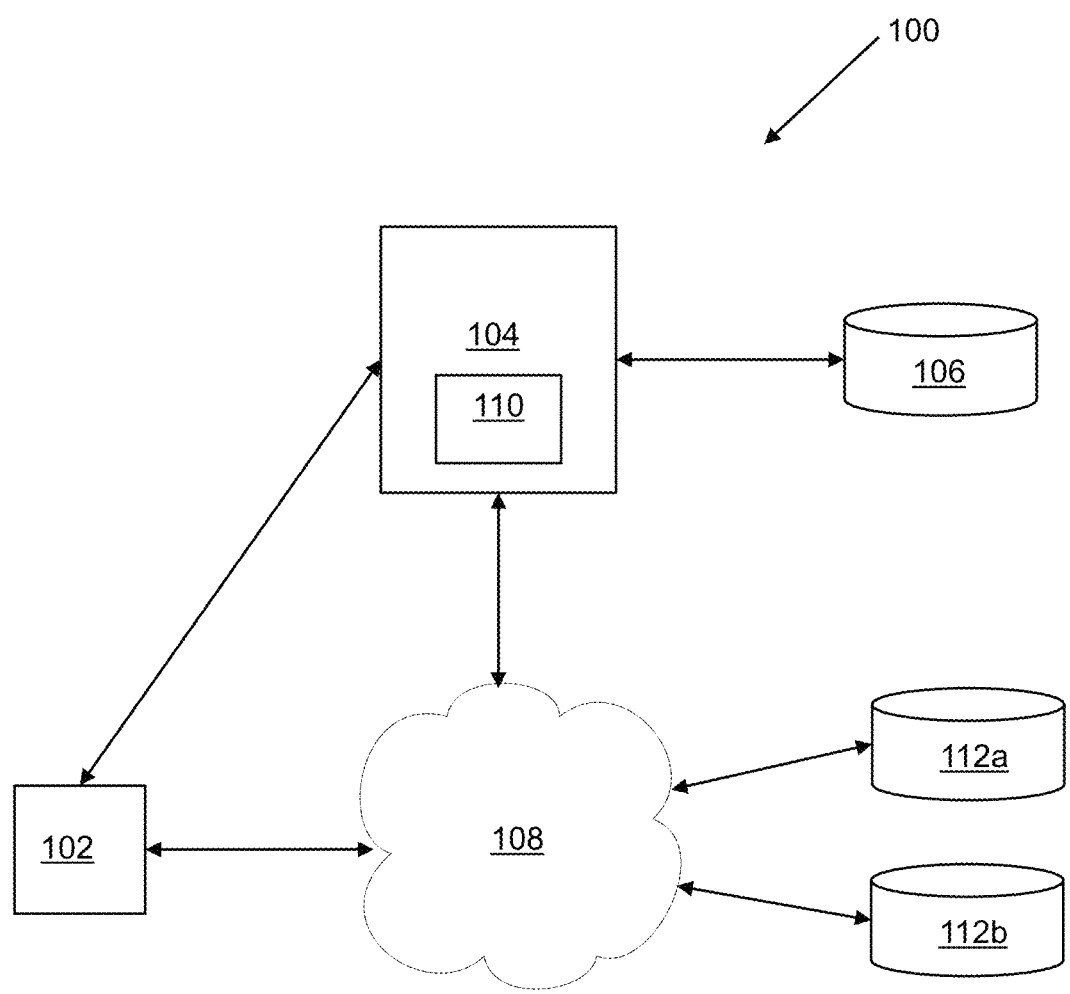
FIG. 1 is a schematic illustration of a system 100 for building a content network of a plurality of users is implemented pursuant to embodiments of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a system for conducting network building assessments to a generate a content network, the system comprising an interface implemented via one or more computer processors that, upon executing computer-executable instructions, causes a user to access the content network to and receive content in accordance to one or more features of the content network, wherein the interface includes a user input component to obtain at least two user identifiers of the user; and a server that implements the network building assessments for generating the content network, wherein the server is implemented via one or more computer processors that, upon executing computer-executable instructions, causes the server to:

receive from the user input component at least two identifiers, wherein the at least two identifiers include a content network identifier and a user identifier;

assess determine, based on the content network identifier to determine at least a part of the identifier, whether the content network identifier is one of an existing content network or new content network, wherein the content network identifier is new content network, request a new content network identifier to generate the new content network;

assess the user identifier to determine whether the user is one of a members or a non-member of the content network, wherein when the user is a non-member of the content network, request information from the user, and generate user profile based on the received information from the non-member via the user input component; and build content network for display in the interface in accordance to one or more features of the new content network and the generated user profile.

Embodiments of the present disclosure are of advantage in that the aforesaid system is capable of building content network of a plurality of users which includes member and non-members associated with the content network. Optionally, the content network corresponds to at least one of housing society, institution, college, or company. Optionally, the system is configured to build a new content network based on receiving information from non-members. Beneficially, the system automatically creates groups based on unique content network identifier and user identifier. Further beneficially, the system allows new members to join an existing content network based on pseudo user identifier.

Pursuant to embodiments of the present disclosure, the system conducts one or more network building assessments for reviewing association between members and non-members for building one or more content networks. In an embodiment, reviewing associations include determining whether a user is member or a non-member of the content network. Moreover, the one or more network building assessments include determining whether a content network exists or not. If content network does not exist, the system is configured to create a new content network based on information received from the non-member. The network building assessments allows in content generation of the content network by including non-members or by creating new content networks. Beneficially, assessment of the members allows the content network to prevent fraudulent members from accessing the content network.

Throughout the present disclosure, the term content network refers to a user generated content shared within a network of users in accordance one or more features of the content network. In an example, the content includes text, images, videos, audio files, post, GIF etc., shared within a user network of a housing society or institution or college or company. In an embodiment, the system includes one or more content networks configured to provide content to user based on the one or more features related to the one or more content networks. Optionally, the one or more content network includes content network of housing society, content network of institution, content network of college, or content network of company. The system is operable to provide content data to a plurality of users via an interface implemented on one more computer processor that, upon executing computer-executable instructions, causes a user of the content network to receive content in accordance to one or more features of the content network.

The interface includes user input component to obtain at least two identifiers, wherein the at least two identifiers include a content network identifier and a user identifier user identifier and a domain address. The server is configured to receive information pertaining to the two identifiers from user input component of the interface. The server is configured to assess the content network identifier to determine whether the content network identifier is one of an existing content network or new content network. The server requests a new content network identifier to generate the new content network in case the the content network identifier does not correspond to the existing content network. The system is configured to assess whether the user is one of a member or non-member of the content network. The system is configured to request further information from the user in response to determination that the user is non-member of the content network. The system thereafter generates a user profile of the user based on the received information. The system builds content for displays in the interface of the user in accordance to one or more features of the new content network and the generated user profile.

The server is operable to assess whether the content network identifier corresponds to one of an existing content network or new content network. In an embodiment, the server is communicably connected to a database, wherein the database is configured to store a list of user identifiers and content network identifiers. The server is configured to determine whether the content network identifier corresponds to existing content networks by conducting a search for the identifier in the database. Upon determination that the domain address does not exists, the system is configured to request new content identifier from the non-member for creation of a new content network. The system is operable build a new content network based on the received new content network identifier. Optionally, requesting new content identifier from the non-member for creation of a new content network includes requesting a pseudo user identifier and a new content network identifier.

The server is configured to assess the user identifier to determine whether the user is one of a member or a non-member of the content network, wherein when the user is a non-member of the existing content networks. Optionally, the server compares the received user identifier with user identifiers stored in the database arrangement to allow the user to assess the content network. Optionally, the server arrangement is operable to generate user profile of the member of the content network based on user identifier corresponding to the content network identifier of the content network. In an example, the user input component receives at least one identifier from the user corresponding to his official email id of one of institution or college or company or corporation or housing society. The server arrangement determines if his official college email ID is narayan@iitm.ac.in, based on the @iitm.ac.in, the user will be directed to his college home page of the application which contains feature of Marketplace, noticeboard article published, directory of mini-profile, opinion poll, trends, forums, cab-pool pertaining to his college only. If the user does not have an official email ID, he can enter a pseudo email ID in the format name@domain_name(of his college) .com, wherein he will enter the mobile application having @domain-name(of his college).com page which will contain feature of Marketplace, noticeboard article published, directory of mini-profile, opinion poll, trends, forums, cab-pool pertaining to his college only. Optionally, the server arrangement user profile of a non-member of the content network is generated based on the pseudo user identifier corresponding to the new content network identifier or content network identifiers to allow access of the new content network or new content network. In another example, if the user does not have an official email ID and a domain name for his institution or housing society or company or corporation, he can enter a pseudo email ID in the format name@ unique-name(of his housing society).com, wherein he will enter the mobile application having @unique-name(of his housing society).com page which will contain feature of Marketplace, noticeboard article published, directory of mini-profile, opinion poll, trends, forums, cab-pool pertaining to his housing society only.

Optionally, the one or more network features includes features corresponding to marketplace, noticeboard, articles published, directory of members, mini-profile, opinion poll, trends and forums. In an embodiment, the members of a content network can use the feature of marketplace to buy and sell items within the content network. Optionally, the members can haggle the prices of items within the content network. Moreover, a member of the content network can optionally notify the other members of the content network via the noticeboard feature. Members of the content delivery network can post information pertaining their housing society, college, company, etc. in the noticeboard. Further, the features of the content network include features for conducting opinion poll on issues of their choice. The said opinion polls can be saved within the content network for future references. Furthermore, the content network is operable to display current trending topics. A member can further read articles on the trending topics from within the content network or refer to other online websites. Optionally, the feature of cab pool options is also available within the content network. Members can either list their cab pool option within the noticeboard or notify members in accordance to the cab pool option.

In another embodiment, the at least two identifiers include a location of the user and user name. The system is configured to assess the location of the location of the user to allow access to the content network. The system is configured to store the location of the users and region of the content network. Optionally, the region of the content network corresponds to location of the college, institution, company or housing society. The system is configured to compare the location of the user with the stored locations to allow access to the content network. Further, the system is also configured to allow access to the content network by assessing user name of the user. The system is configured to compare the user name corresponding to a content network to allow access to the content network.

Beneficially, the user operating the computer implemented product can access content network associated with one of Institution or college or company or housing society home page for a computing device. The content network contains features of Marketplace, noticeboard article published, directory of mini-profile, opinion poll, trends, forums, cab-pool pertaining to his Institution or college or company or housing society only. A plurality of users can access the content network with their official email ID alone and they will be directed to their respective Institution or college or company or housing society home page based on the @abc.com address in the official email ID username@abc.com. Further beneficially, content network would include group of user of same Institution or college or company or housing society directed to their respective home page, by creating a community of their Institution or college or company or housing society and having features of Marketplace, noticeboard article published, directory of mini-profile, opinion poll, trends, forums, cab-pool pertaining to his/her Institution or college or company or housing society only.

Optionally, the system for conducting network building assessments to generate a content network, the system comprising an interface implemented via one or more computer processors that, upon executing computer-executable instructions, causes a user to access the content network and receive content in accordance to one or more features of the content network, wherein the interface includes a user input component to obtain at least two user identifiers from the user. a server that implements the network building assessments for generating the content network, wherein the server is implemented via one or more computer processors that, upon executing computer-executable instructions, causes the server to receive from the user input component the at least two identifiers, wherein the at least two identifiers include a content network identifier and a user identifier. Assess the content network identifier to determine whether the content network identifier is one of an existing content network or new content network, wherein the content network identifier is new content network, request a new content network identifier to generate the new content network. Access the user identifier to determine whether the user is one of a member or a non-member of the content network, wherein when the user is a non-member of the existing content networks, request information from the user, and generate user profile based on the received information from the non-member via the user input component. Build content for display in the interface in accordance to one or more features of the new content network and the generated user profile.

Optionally, the content network corresponds to at least one of housing society, institution, college, or company. The system of claim 1, wherein the system includes a database arrangement configured to store a list of user identifiers and content network identifiers. The new content network identifier includes a pseudo user identifier and a new content network identifier.

The server compares the received user input with content network identifiers stored in the database arrangement to allow the user to access the content network. The server compares the received user identifier with user identifiers stored in the database arrangement to allow the user to access the content network.

User profile of the member of the content network is generated based on the user identifier corresponding to the content network identifier of the content network. User profile of a non-member of the content network is generated based on the pseudo user identifier corresponding to the new content network identifier or content network identifiers to allow access of the new content network or new content network.

The term "client device" generally refers to a device executing an application, program, or process in a client/server relationship that requests information or services from another application, program, process or device (namely, a server) on a data communication network. Importantly, the terms "client" and "server" are relative, as an application may be a client to one application but a server to another application. Throughout the present disclosure, the term "client device" refers to a device associated with a user that acts a client to the server arrangement in a client/server relationship, wherein such a device can be a personal device of the user or a server in a local environment of the user (for example, such as an internal server of a research organization where the current research work has been performed).

Optionally, the graphical user interface is provided in a form of a web form that allows the user to provide the content from the server. Alternatively, optionally, the graphical user interface is provided by way of a trusted software application that, when executed at the client device, allows the user to operate the system.

Optionally, the trusted software application is received (for example, downloaded) at the client device from the server arrangement or a trusted third party. The trusted third party can be a publically-accessible digital distribution platform, for example, such as Google Play®, the App Store® (for iOS®) and the like.

The interface is implemented on a consumer device via one or more computer processors that, upon executing computer-executable instructions, causes a user of the content network to receive content in accordance to one or more features of the content network.

The data memory optionally includes non-removable memory, removable memory, or a combination thereof. The non-removable memory, for example, includes Random-Access Memory (RAM), Read-Only Memory (ROM), flash memory, or a hard drive. The removable memory, for example, includes flash memory cards, memory sticks, or smart cards.

The data memory stores the computer implemented product, while the processor is operable to execute the computer implemented product. The computer implemented product may be a native software application, a software application running on a browser, or a plug-in application provided by a website.

Executing the computer implemented product on the processor results in generation of a user interface on a display screen of the consumer device. The user interface is configured to facilitate user's interactions, for example, with the system 100.

Beneficially, the I/O devices include the display screen for providing the user interface. The I/O devices also include a speaker and/or a headphone for providing an audio output to the user.

When executed on the processor, the computer implemented product is configured to perform operations as described in conjunction with FIG. 1. Accordingly, the computer program product comprising a non-transitory computer-readable storage medium having computer-readable instructions stored thereon, the computer-readable instructions being executable by a computerized device comprising processing hardware to execute, when executed on the processor, is configured to perform one or more of:
  providing an interface to allow a user of the content network to receive content in accordance to one or more features of the content network,
  obtaining at least one user identifier of the user from a user input component of the interface;
  causing a server to implement one or more network building assessments for the content network that, when executed, includes:
  receiving from the user input component the at least one identifier for the user of the content network, wherein the user is one of a member or a non-member of the content network;
  determining, based at least in part of the identifier, whether the user is one of a member or a non-member of the content network;
  requesting information from the user in response to determining that the user is a non-member of the content network;
  generating user profile based on the received information from the non-member via the user input component; and
  building content for display in the interface in accordance to one or more features of the content network and the user profile.

Moreover, the network interface optionally allows the computer implemented product to communicate with the server via a communication network. The communication network may, for example, be a collection of individual networks, interconnected with each other and functioning as a single large network. Such individual networks may be wired, wireless, or a combination thereof. Examples of such individual networks include, but are not limited to, LANs, WANs, MANs, WLANs, WWANs, WMANs, 2G telecommunication networks, 3G telecommunication networks, 4G telecommunication networks, and WiMAX networks.

The computer implemented product is optionally implemented by way of at least one of: a mobile phone, a smart telephone, an MID, a tablet computer, a UMPC, a phablet computer, a PDA, a web pad, a PC, a handheld PC, a laptop computer, a desktop computer and a large-sized touch screen with an embedded PC.

It is to be understood that the specific designation for the computer implemented product is provided as an example and is not to be construed as limiting the computer implemented product to specific numbers, types, or arrangements of modules and/or components of the computer implemented product. A person skilled in the art will recognize many variations, alternatives, and modifications of embodiments of the present disclosure.

DETAILED DESCRIPTION OF THE DRAWINGS

Embodiments of the present disclosure substantially eliminate, or at least partially address, problems in the prior art, and assists the consumers and vendors.

Referring now to drawings, particularly by their reference numbers, FIG. 1 is a schematic illustration of a system 100 for building a content network of a plurality of users. The system 100 includes an interface 102, and a server 104. The server 104 comprises a processor 110 communicably coupled via the data communication network 108 with the interface 102. Optionally, the network environment 100 also includes a plurality of database servers (depicted as database servers 112a and 112b) communicably coupled via the data communication network 108 with the processor 110 of the server arrangement 104.

The communication network may, for example, be a collection of individual networks, interconnected with each other and functioning as a single large network. Such individual networks may be wired, wireless, or a combination thereof. Examples of such individual networks include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, second generation (2G) telecommunication networks, third generation (3G) telecommunication networks, fourth generation (4G) telecommunication networks, and Worldwide Interoperability for Microwave Access (WiMAX) networks.

The interface 102 includes a computer implemented product, also referred to as user input component, 102a. The computer implemented product 102a stored in the customer device 102 is operable to enable a user to input information about the identity of the user. The information includes email ID of the user's institution, college, company, corporation, housing society etc. Optionally, a user may create a list of network which the user may be interested in.

The interface 102 includes but are not limited to, a mobile phone, a smart phone, a Mobile Internet Device (MID), a tablet computer, an Ultra-Mobile Personal Computer (UMPC), a phablet computer, a Personal Digital Assistant (PDA), a web pad, a Personal Computer (PC), a handheld PC, a laptop computer, a desktop computer and a large-sized touch screen with an embedded PC.

FIG. 1 is merely an example. A person skilled in the art will recognize many variations, alternatives, and modifications of embodiments of the present disclosure. FIG. 1 is merely an example, which should not unduly limit the scope of the claims herein. It is to be understood that the specific designation for the network environment 100 is provided as an example and is not to be construed as limiting the network environment 100 to specific numbers, types, or arrangements of server arrangements, client devices, database arrangements, data communication networks and database servers. A person skilled in the art will recognize many variations, alternatives, and modifications of embodiments of the present disclosure.

Figure 2A:
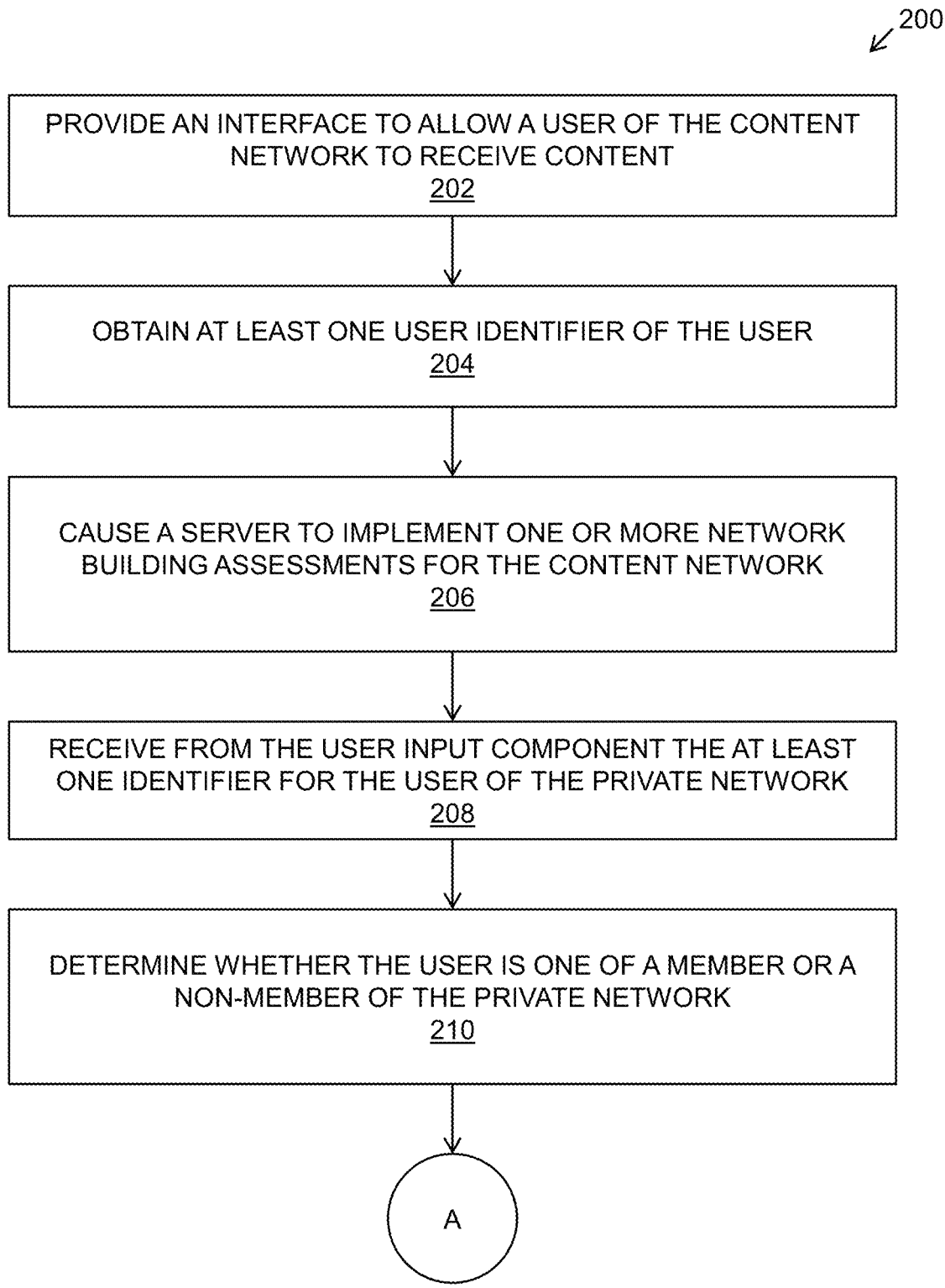
FIGS. 2A and 2B collectively, illustrate steps of a method 200 of building a content network of a plurality of users in accordance with an embodiment of the present disclosure.
Figure 2B:
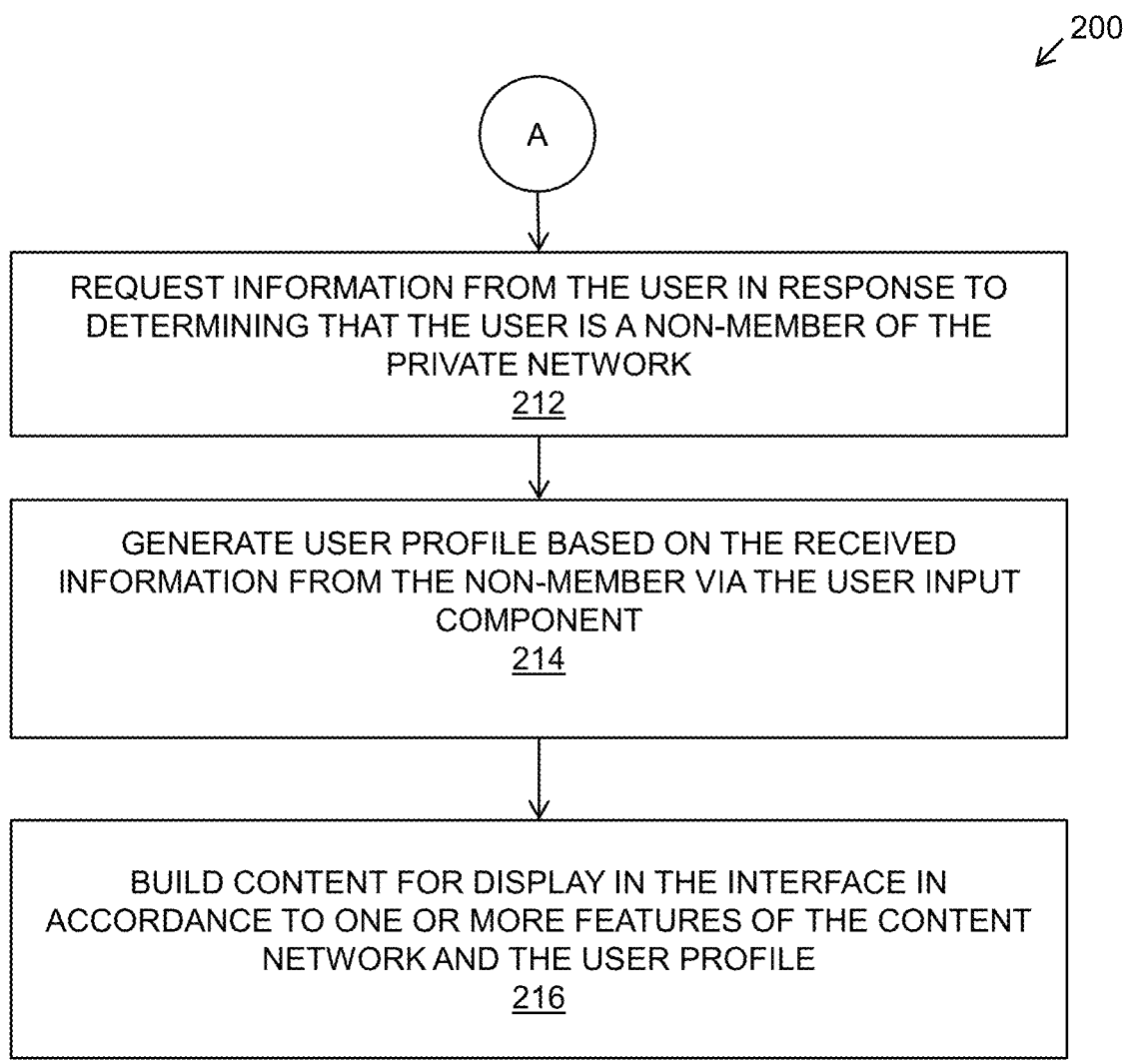

Referring to FIGS. 2A and 2B collectively, illustrated are steps of a method 200 of building a content network of a plurality of users, in accordance with an embodiment of the present disclosure. The method is depicted as a collection of steps in a logical flow diagram, which represents a sequence of steps that can be implemented in hardware, software, or a combination thereof, for example as aforementioned.

At a step 202, an interface is provided to allow a user of the content network to receive content.

At a step 204, obtain at least one user identifier of the user from a user input component of the interface.

At a step 206, causing a server to implement one or more network building assessments for the content network.

At a step 208, receiving from the user input component the at least one identifier for the user of the content network, wherein the user is one of a member or a non-member of the content network.

At a step 210, determining, based at least in part of the identifier, whether the user is one of a member or a non-member of the content network.

At a step 212, requesting information from the user in response to determining that the user is a non-member of the content network.

At a step 216, generating user profile based on the received information from the non-member via the user input component.

At a step 216, building content for display in the interface in accordance to one or more features of the content network and the user profile The steps 202 to 216 are only illustrative and other alternatives can also be provided where one or more steps are added, one or more steps are removed, or one or more steps are provided in a different sequence without departing from the scope of the claims herein.

Figure 3:
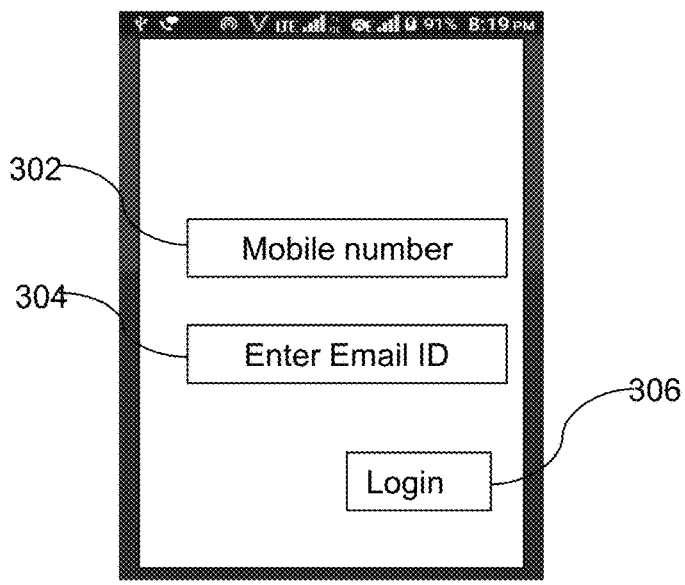
FIG. 3 is a schematic illustration of an interface 102 for allowing a user to assess one or more content network in accordance to one or more features of the content network.

FIG. 3 is a schematic illustration of an interface 102 for allowing a user to access one or more content network in accordance to one or more features of the content network. The interface 102 comprises of mobile number input component 302, email id input component 304 and a login 306 button. The mobile number input component 302 receives a mobile number of the user for authentication of the user. In an embodiment, the server is configured to receive the mobile number of the user to generate an OTP for authentication of the user. The OTP received at a mobile device of the user is auto-confirmed by the server or manually received by the server for authentication of the user. The email id input component 304 comprises at least one user identifier and domain name corresponding to a content network.

The server 104 is configured to receive the at least one user identifier user and domain name corresponding to a content network from the email id input component 304 for determining whether the at least one user identifier corresponds to a member or non-member of the content network, and wherein the domain name is used for determining whether the domain name corresponds to one or more content networks or new content network. Based on the said assessment, the server allows the user to access the one or more content networks or create a new content network.

FIG. 3 is merely an example. A person skilled in the art will recognize many variations, alternatives, and modifications of embodiments of the present disclosure. FIG. 3 is merely an example, which should not unduly limit the scope of the claims herein. It is to be understood that the specific designation for the network environment is provided as an example and is not to be construed as limiting the network environment to specific numbers, types, or arrangements of server arrangements, client devices, database arrangements, data communication networks and database servers. A person skilled in the art will recognize many variations, alternatives, and modifications of embodiments of the present disclosure.

Figure 4:
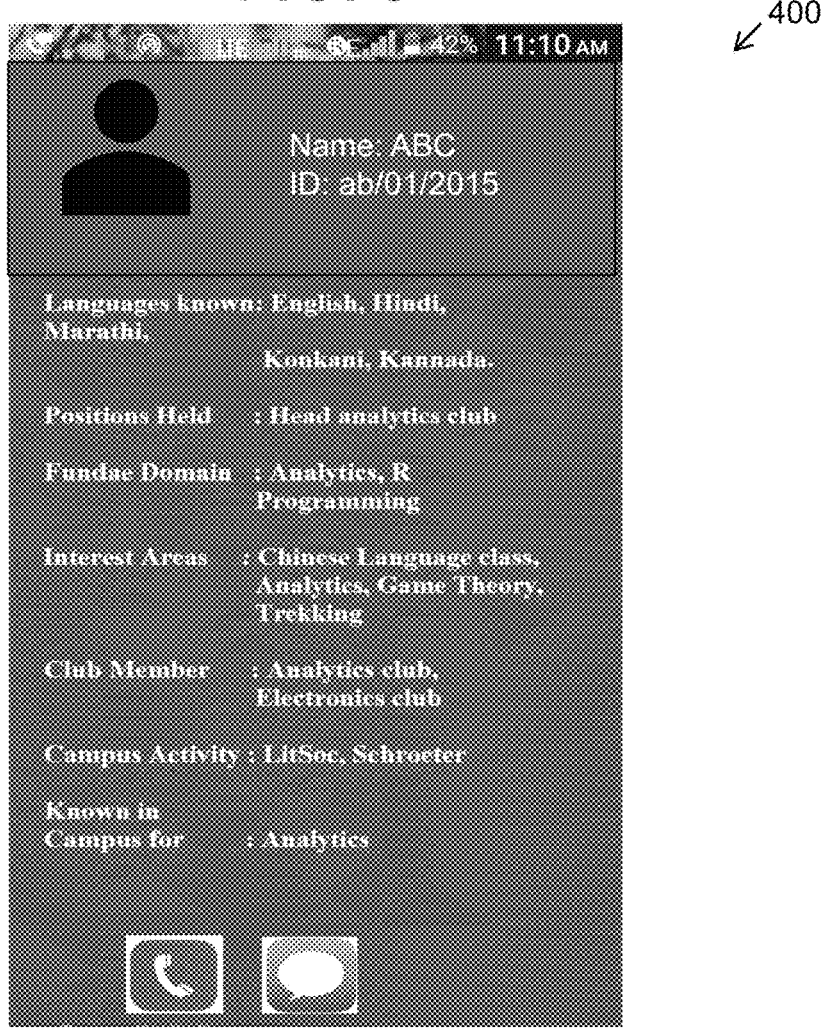
FIG. 4 is a schematic illustration of a user profile 400 of a member, in accordance with an embodiment of the present disclosure.

FIG. 4 is a schematic illustration of a user profile 400 of a member. The user profile is typically generated after confirmation that the user is a member. In an embodiment, a user profile includes name, profile picture, languages known, position held, interest areas, club membership, activities, etc. The member has an option of calling or messaging the user from the profile. Optionally, the user can disable the call and message option so as to avoid being contacted by any other user. The feature provides seamless internal communication in the content network.

FIG. 4 is merely an example. A person skilled in the art will recognize many variations, alternatives, and modifications of embodiments of the present disclosure. FIG. 4 is merely an example, which should not unduly limit the scope of the claims herein. It is to be understood that the specific designation for the network environment is provided as an example and is not to be construed as limiting the network environment to specific numbers, types, or arrangements of server arrangements, client devices, database arrangements, data communication networks and database servers. A person skilled in the art will recognize many variations, alternatives, and modifications of embodiments of the present disclosure.

Figure 5:
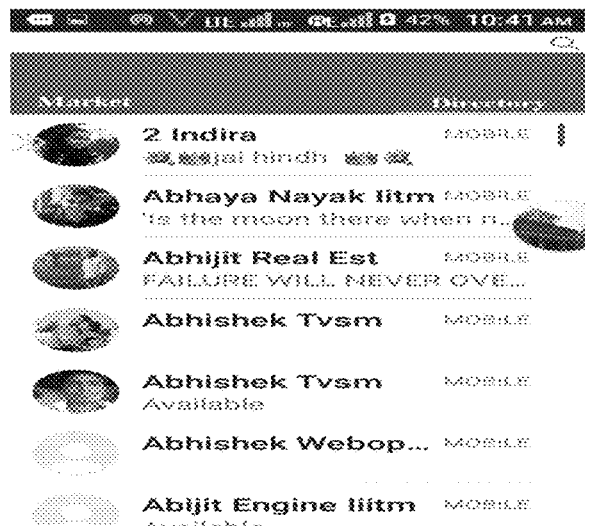
FIG. 5 is a schematic illustration of members directory 500 in a content network, in accordance with an embodiment of the present disclosure.

FIG. 5 is a schematic illustration of members directory 500 in a content network. In an embodiment, the members directory allows a user to search for members within the content network. Beneficially, system allows the members within the content network to communicate with each other. Further beneficially, the members are able to view user profile of other members within the content network. In an embodiment, the system allows users to search for content in the content network. Optionally, searching for content network allows the user to search for other users using name of the user, identifier of the user, interest of the user, languages knows and other parameters in the members directory 500. Optionally, the content network stores the information on the user, interest, preferences, profile picture, languages, interest in movies, and other parameters in the members directory 500. Optionally, the system is configured to access all the information in the content network.

In an embodiment, the system is configured to store all the logs of the plurality of users. The system is also configured to store mini-profile of users, wherein when a user searches or looks up for user then the mini-profile of the user is viewed by the user. The members directory 500, also contains a searching module for allowing the members to search for other users. The user has option to search for members and non-members. Optionally, the members directory 500 is also synced with address book in user's mobile device. Further optionally, the system provides an option to the user to send invite to non-members to the content network. The mini-profile also contains the option to either call the user, message the user.

FIG. 5 is merely an example. A person skilled in the art will recognize many variations, alternatives, and modifications of embodiments of the present disclosure. FIG. 5 is merely an example, which should not unduly limit the scope of the claims herein. It is to be understood that the specific designation for the network environment is provided as an example and is not to be construed as limiting the network environment to specific numbers, types, or arrangements of server arrangements, client devices, database arrangements, data communication networks and database servers. A person skilled in the art will recognize many variations, alternatives, and modifications of embodiments of the present disclosure.

Figure 6:
FIG. 6 is a schematic illustration of a content network 600 for display in content in accordance to one or more features of the content network, in accordance with embodiments of the present disclosure.

FIG. 6 is a schematic illustration of a content network 600 for display in content in accordance to one or more features of the content network. In an embodiment, the content network 600 relates to a content network of IIT Madras, wherein the features of the content network 600 includes buy and sell, events etc. In an embodiment of the present disclosure the feature marketplace contains listing of buy and sell items published by the user of the content network 600. Optionally, user can capture photos of item to be shared on the content network 600 for allowing access to the content. The user can optionally click on submit button to allow access of the content. The user can also enter the name of the item, the description, the price of the item for sharing it on the content network. The system would publish the data in user interface of connected systems or general-purpose computers in accordance to the user profile and capabilities of the content network. The system would display the content for all users of the content network or one or more content networks, depending on the settings of the user. Optionally, another user can subsequently access the content from another device. Further optionally, the system shares the contact details of the seller to buy the content. The user can optionally, choose to message or call the other user for selling the listed item.

Further, alternatively the system allows the user to check details of events through the content network 600. The content network 600 contains list of features published by the user like posters, events, circular, notifications, invitations. Beneficially, the content network 600 allows the user to check the messages, content and items without physically reviewing them. Further beneficially, the content network 600 allows the user to communicate with other users. Optionally, the items listed on the content network can be FIG. 6 is merely an example. A person skilled in the art will recognize many variations, alternatives, and modifications of embodiments of the present disclosure. FIG. 6 is merely an example, which should not unduly limit the scope of the claims herein. It is to be understood that the specific designation for the network environment is provided as an example and is not to be construed as limiting the network environment to specific numbers, types, or arrangements of server arrangements, client devices, database arrangements, data communication networks and database servers. A person skilled in the art will recognize many variations, alternatives, and modifications of embodiments of the present disclosure.

Figure 7A:
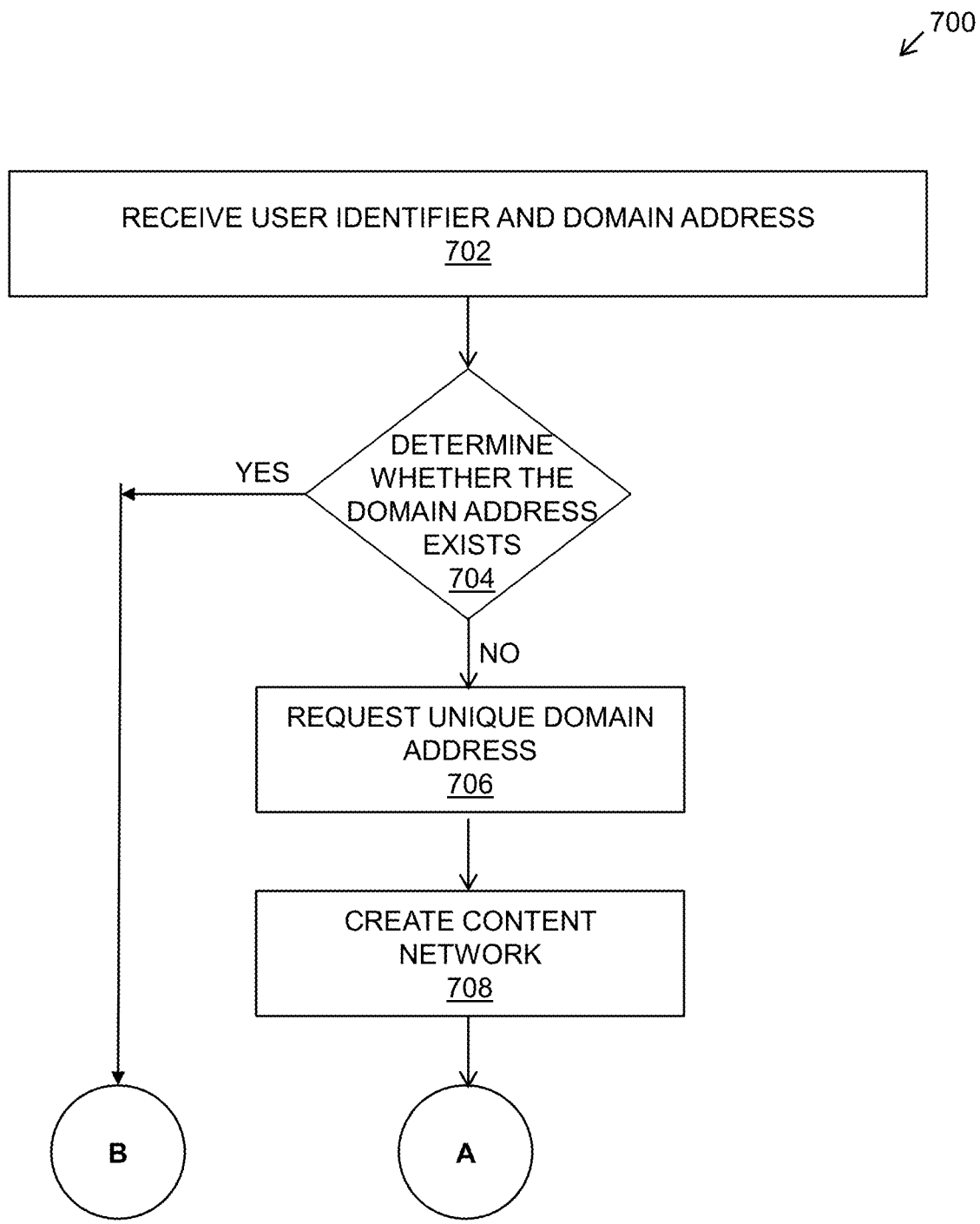
FIGS. 7A-7B illustrate a flow chart of a method of building a content network of a plurality of users, in accordance with an embodiment of the present disclosure.
Figure 7B:
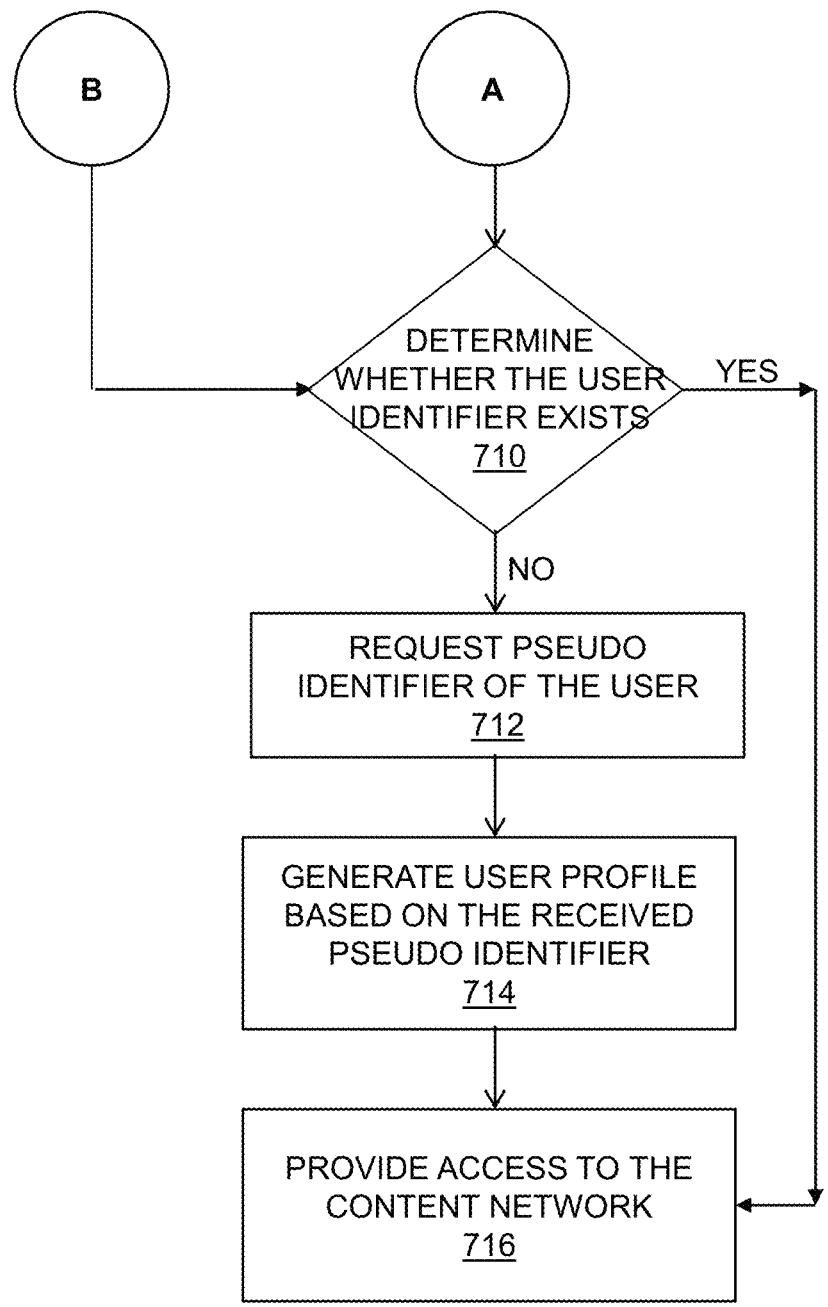

Referring to FIGS. 7A and 7B collectively, illustrated are steps of a method 200 of building a content network of a plurality of users, in accordance with an embodiment of the present disclosure. The method is depicted as a collection of steps in a logical flow diagram, which represents a sequence of steps that can be implemented in hardware, software, or a combination thereof, for example as aforementioned.

At step 702, an interface is provided to receive user identifier and domain address.

At step 704, the system is configured to determine whether the domain address correspond to one or more content networks or a new content network.

At step 706, if the domain name does not correspond to one or more content networks, the system requests for a unique domain address.

At step 708, a new content network is created using the unique domain address.

At step 710, the system is configured to determine whether the user identifier is a member or a non-member identifier.

At step 712, if the user is non-member a pseudo identifier is requested for creation of user profile.

At step 714, a user profile is created based on the received pseudo identifier.

At step 716, the member is granted access to the content network.

The steps 702 to 716 are only illustrative and other alternatives can also be provided where one or more steps are added, one or more steps are removed, or one or more steps are provided in a different sequence without departing from the scope of the claims herein.

Figure 8:
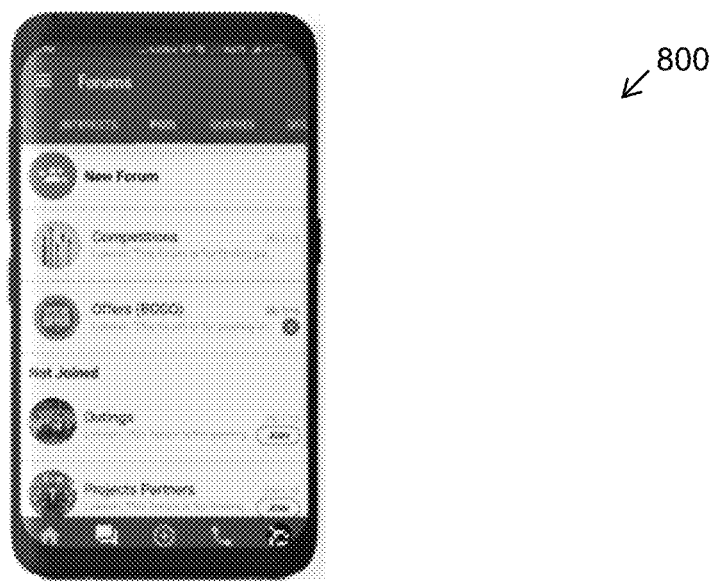
FIG. 8 is a schematic illustration of a forum in a content network, in accordance with an exemplary scenario.

FIG. 8 is a schematic illustration of a forum 800 in a content network. The forum is typically generated based on user request. In an embodiment, the forum incudes competition for the user to join along with other offers. Optionally, the feature forum allows the user to post topics to be discussed with all the user of the content network. A user can enter the topics and click submit button to be viewed by all the user of the community. Any other user can respond to the topic. The forum 800 feature gives a medium for the user of the content network to interact with other users of the content network.

FIG. 8 is merely an example, a person skilled in the art will recognize many variations, alternatives, and modifications of embodiments of the present disclosure. FIG. 8 is merely an example, which should not unduly limit the scope of the claims herein. It is to be understood that the specific designation for the network environment is provided as an example and is not to be construed as limiting the network environment to specific numbers, types, or arrangements of server arrangements, client devices, database arrangements, data communication networks and database servers. A person skilled in the art will recognize many variations, alternatives, and modifications of embodiments of the present disclosure.

Figure 9:
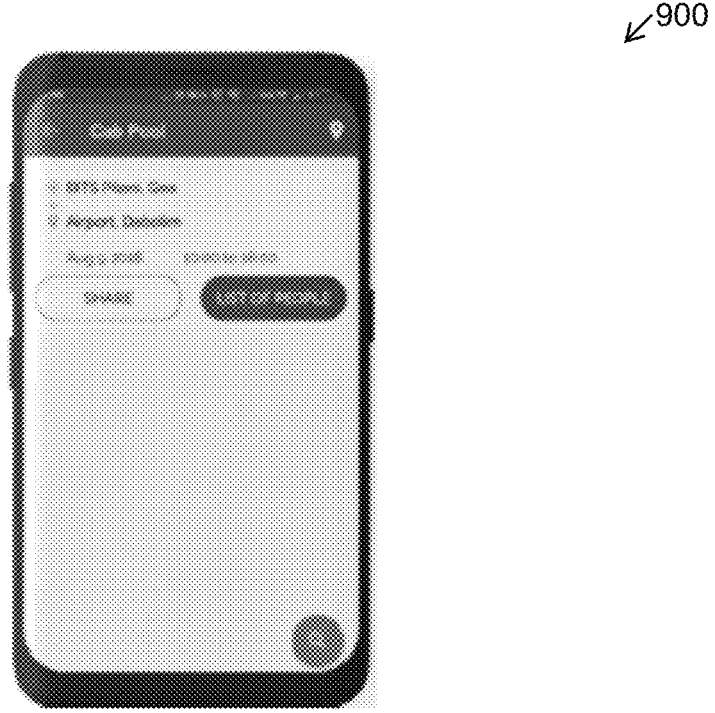
FIG. 9 is a schematic illustration of a car pool in a content network, in accordance with an exemplary scenario.

FIG. 9 is a schematic illustration of a cab pool 900 in a content network. The cab pool option is typically generated based on user request. In an embodiment, the cab pool option includes. The feature cab-pool provides the facility wherein the user can create a cab-pool request from so and so place with date and time and all the user from the community can view the cabpool request. Any other user can apply to it as to join the cabpool with the user who has published it. The cabpool feature is especially handy as all the user from the community can view the request and respond to it.

FIG. 9 is merely an example a person skilled in the art will recognize many variations, alternatives, and modifications of embodiments of the present disclosure. FIG. 9 is merely an example, which should not unduly limit the scope of the claims herein. It is to be understood that the specific designation for the network environment is provided as an example and is not to be construed as limiting the network environment to specific numbers, types, or arrangements of server arrangements, client devices, database arrangements, data communication networks and database servers. A person skilled in the art will recognize many variations, alternatives, and modifications of embodiments of the present disclosure.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A system for conducting network building assessments to build content for a plurality of users, the system comprising:
an interface implemented via one or more computer processors that, upon executing computer-executable instructions, causes a user to access a content network and receive content in accordance to one or more features of the content network, wherein the interface includes a user input component to obtain at least two user identifiers from the user, wherein the at least two user identifiers includes a mobile number input component and an email id input component, wherein the email id input component includes a content network identifier and a user identifier; and
a database arrangement configured to store a list of user identifiers and content network identifiers;
a server that implements the network building assessments for generating the content network, characterized in that the server is implemented via one or more computer processors that, upon executing computer-executable instructions, causes the server to:
receive from the user input component the a content network identifier and a user identifier;
assess the content network identifier to determine whether the content network identifier is one of an existing content network or new content network, wherein the determination includes comparing the received user input with content network identifiers stored in the database arrangement to determine whether the content network identifier is one of an existing content network or new content network, wherein the content network identifier corresponds to domain name of the content network, wherein the content network identifier is new content network, request a new content network identifier to generate the new content network;
assess the user identifier to determine whether the user is one of a member or a non-member of the content network, wherein the determination includes comparing the received user identifier with user identifiers stored in the database arrangement, wherein when the user is a non-member of the existing content networks, request information from the user, and generate user profile based on the received information from the non-member via the user input component; and
group the generated user profile according to the content network identifiers stored in the database arrangement to build content for display in the interface in accordance to one or more features of the new content network and the generated user profile.

2. The system of claim 1, wherein the new content network identifier includes a pseudo user identifier and a new content network identifier.

3. The system of claim 1, wherein user profile of the member of the content network is generated based on the user identifier corresponding to the content network identifier of the content network.

4. The system of claim 2, wherein user profile of a non-member of the content network is generated based on the pseudo user identifier corresponding to the new content network identifier or content network identifiers to allow access of the new content network or new content network.

5. The system of claim 1, wherein the one or more network features includes features corresponding to marketplace, noticeboard, articles published, directory of members with mini-profile, opinion poll, trends and forums.

6. A method for conducting network building assessments to build content for a plurality of users, the method comprising:
accessing a content network by a user and receiving content in accordance to one or more features of the content network via an interface, wherein the interface includes a user input component to obtain at least two user identifiers from the user, wherein the at least two user identifiers includes a mobile number input component and an email id input component, wherein the email id input component includes a content network identifier and a user identifier;
receiving from the user input component a content network identifier and a user identifier;
assessing the content network identifier to determine whether the content network identifier is one of an existing content network or new content network, wherein the determination includes comparing the received user input with content network identifiers stored in the database arrangement to determine whether the content network identifier is one of an existing content network or new content network, wherein the content network identifier corresponds to domain name of the content network, wherein the content network identifier is new content network, request a new content network identifier to generate the new content network;
assessing the user identifier to determine whether the user is one of a member or a non-member of the content network, wherein the determination includes comparing the received user identifier with user identifiers stored in the database arrangement, wherein when the user is a non-member of the existing content networks, request information from the user, and generate user profile based on the received information from the non-member via the user input component; and grouping the generated user profile according to the content network identifiers stored in the database arrangement to build content for display in the interface in accordance with one or more features of the new content network and the generated user profile.

7. The method of claim 6, wherein the new content network identifier includes a pseudo user identifier and a new content network identifier.

8. The method of claim 6, wherein user profile of the member of the content network is generated based on the user identifier corresponding to the content network identifier of the content network.

9. The method of claim 6, wherein user profile of a non-member of the content network is generated based on the pseudo user identifier corresponding to the new content network identifier or content network identifiers to allow access of the new content network or new content network.

10. The method of claim 6, wherein the one or more network features includes features corresponding to marketplace, noticeboard, articles published, directory of members with mini-profile, opinion poll, trends and forums.

\* \* \* \* \*